3,059,028
PROCESS FOR THE CONVERSION OF A CYCLIC TRIOLEFIN
Robert H. Perry, Jr., Baytown, Tex., assignor, by mesne assignments, to Esso Research and Engineering Company, Elizabeth, N.J., a corporation of Delaware
No Drawing. Filed Sept. 3, 1959, Ser. No. 837,783
11 Claims. (Cl. 260—533)

This invention relates to a method for converting a cyclic non-conjugated polyolefin to useful products. More particularly, this invention relates to a process for the selective monoozonolysis of a non-conjugated polyolefin such as cyclododecatriene and to a process for the selective oxidation of the selective monoozonolysis product.

The starting material for the present invention is a cyclic non-conjugated polyolefin such as 1,4-cyclohexadiene, 1,4-cycloheptadiene, 1,4-cyclooctadiene, 1,5-cyclooctadiene, 1,5,9-cyclododecatriene, etc. The compound 1,5,9-cyclododecatriene, a trimer of butadiene, may be prepared in the manner described by G. Wilke, Angewandte Chemie, 69, 397 (1957). The chemical structure of 1,5,9-cyclododecatriene may be visualized as follows:

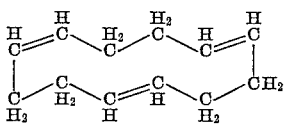

It is to be observed from this that the above-identified cyclic polyolefins are non-conjugated. Accordingly, the double bonds have approximately the same degree of reactivity with respect to chemical reactions. As a consequence, selective conversion of only one of the olefinic bonds presents a serious problem.

It has now been discovered that such compounds may be selectively monoozonized to provide an olefinic monoozonolysis product. This is accomplished by preparing a mixture of the cyclic non-conjugated polyolefin with a reactive ozonolysis solvent, an unreactive ozonolysis solvent, or a mixture thereof. A mixture of ozone and oxygen containing from about 2 to 6 mol percent of ozone is then passed through the solution at a temperature within the range of about −80° to +25° C. for a period of time sufficient to permit the reaction of about 0.03 to about 0.1 mol of ozone per mol equivalent of double bonds in the starting material. If more than about 0.1 mol is employed, the selectivity of the ozonolysis reaction is no longer obtainable.

Among the non-reactive solvents that may be utilized in accordance with the present invention are materials such as alkanes (pentane, hexane, etc.), naphthenes such as cyclohexane, aromatics such as benzene, halogenated hydrocarbons such as carbon tetrachloride, chloroform, methylene chloride, methyl chloride, ethyl chloride, ethyl bromide, etc., ketones such as acetone, amides such as formamide, ether, nitromethane, acetic anhydride, etc. Examples of reactive solvents which may be utilized include $C_1$ to $C_4$ aliphatic alcohols such as methanol, ethanol, isopropyl alcohol, tertiary butyl alcohol, etc., aliphatic acids such as formic acid, acetic acid, propionic acid, etc. Mixtures of non-reactive with reactive solvents may also be utilized.

When the solvent consists of a non-reactive solvent, the ozonolysis intermediate may be an ozonide characterized by the presence of ozonide groups of the following general structure:

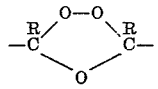

or a polymeric peroxide characterized by the presence of peroxide groups of the following generalized formula:

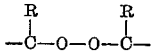

In both cases, R represents hydrogen or a hydrocarbon group.

When the ozonolysis solvent either consists of a reactive solvent or comprises a mixture of a reactive solvent with a non-reactive solvent, the ozonolysis product is normally characterized by the presence of hydroperoxide groups and acyloxy or alkoxy groups derived from the reactive solvent.

Normally, the solvent to be utilized will be determined by the desired temperature of ozonolysis, a solvent or solvent mixture being employed which is liquid at the desired ozonolysis temperature and which has sufficient solubilizing action at the ozonolysis temperature to retain at least a portion of the cyclic non-conjugated polyolefin in solution.

The foregoing is explained in greater detail in an article by Philip S. Bailey, entitled "The Reactions of Ozone with Organic Compounds" in Chemical Reviews (vol. 58, No. V, October 1958, pages 925–1010).

As indicated above, it is necessary to regulate the ozonolysis reaction in a manner such that from about 0.03 to about 0.1 mol of ozone is reacted per mol equivalent of olefinic bond. If less than about 0.03 mol equivalent of ozone is utilized, the conversion is unrealistically low. If more than about 0.1 mol equivalent of ozone is utilized, the selectivity is lost.

At the end of the ozonolysis reaction, the reaction mixture will contain solvent, monoozonolysis product, and unreacted polyolefin.

The monoozonolysis product may be recovered from the reaction mixture in any convenient desired manner such as by distillation, fractional crystallization, etc.

As another example, the solvent may be evaporated from the reaction mixture at the end of the reaction whereby a light liquid phase consisting primarily of polyolefin will separate from a heavier liquid phase consisting primarily of the monoozonolysis product. The light liquid phase may be separated by simple decantation, leaving substantially pure monoozonolysis product in the heavier liquid layer.

It has been further discovered in accordance with the present invention that the monozonolysis product may be substantially selectively converted to the corresponding alpha,omega dicarboxylic acid by a particular oxidation reaction. This particular step presents difficulty because non-conjugated olefinic double bonds are of the same order of reactivity as ozonide and peroxide groups with respect to oxidation susceptibility.

Direct oxidation of the monoozonolysis product by conventional methods such as decomposition with hydrogen peroxide results in a non-selective oxidation of olefinic bonds as well as the ozonide or peroxide groups.

It has been discovered that selective oxidation of the ozonide groups or peroxide groups or both may be accomplished by initiating an oxidation reaction between the monoozonolysis product and an oxide of a heavy metal at a temperature within the range of about 0° to about 50° C. After the reaction is initiated, as evidenced by a spontaneous temperature rise, the oxidation medium is made basic through the addition of a suitable base such as an alkali metal or alkaline earth metal hydroxide. When basic conditions are established, there will be a substantial spontaneous temperature rise and therefore it is generally preferable to slowly add the base over a reaction period within the range of about 0.5 to 5 hours, the total amount of base employed being in molar excess of that required for neutralization of acid groups formed by oxidation of the monoozonolysis product. Thus, for example, from about 1.05 to about 1.5 mol equivalents of base may be employed per mol equivalent of monoozonolysis product.

As a consequence of this reaction, the monoozonolysis product is substantially selectively converted to a salt of an alpha,omega dicarboxylic acid.

If it is attempted to conduct the oxidation reaction without the addition of a base, unsatisfactory results are obtained. This is likewise the case if the oxidation reaction is initiated in the presence of a base.

A wide variety of metal oxides may be utilized for the oxidation step including, for example, silver oxide, cupric oxide, cobaltic oxide, manganese dioxide, ferric oxide, lead oxide, mercuric oxide, etc.

Although the oxidation reaction may be conducted in the absence of a solvent, it is preferable to utilize a solvent which is substantially inert to oxidation under the conditions employed, such as methanol, water, ethanol, ethyl acetate, dioxane, methyl ethyl ketone, pyridine, etc.

Any desired recovery technique may be utilized to recover the dioic acid. For example, when the oxidation reaction is conducted in the presence of methanol or water or a mixture thereof, the reaction mixture at the end of the oxidation reaction will consist of an aqueous solution of a salt of the dioic acid, such solution having suspended therein free metal derived from the metal oxide, together with unreacted metal oxide, if any. This solution may be filtered to remove suspended solid metal-containing particles, evaporated to remove volatile organic solvents and then acidified with a suitable acid such as dilute hydrochloric acid, dilute sulfuric acid, dilute nitric acid, etc., whereby the dioic acid will be precipitated. The acid may thereafter be recovered by simple filtration and purified by suitable washing.

The dioic acids prepared in this fashion may be utilized directly as a raw material for the preparation of a wide variety of useful products such as unsaturated diesters, polyesters, polyamides, etc.

They may also be hydrogenated with comparative ease with molecular hydrogen in the presence of a suitable hydrogenation catalyst such as palladium on charcoal, metallic palladium, metallic cobalt, etc. to provide saturated dioic acids which may likewise be utilized for a variety of useful purposes such as the preparation of plasticizers, synthetic lubricants, polyester-type plastics, etc.

The invention will be further illustrated by the following specific examples which are given by way of illustration and not as limitations on the scope of this invention.

SELECTIVE MONOOZONOLYSIS OF 1,5,9-CYCLODODECATRIENE

Example I 40 grams of 1,5,9-cyclododecatriene were dissolved in 160 ml. of a solvent mixture consisting of equal volumes of dichloromethane and ethanol to thereby provide a 20 percent solution of 1,5,9-cyclododecatriene in the solvent mixture. The thus-prepared solution was chilled to a temperature of about −78° C. and a mixture of oxygen and ozone containing about 1.8 percent ozone was passed through the mixture at the rate of about 0.02 cubic foot of gaseous mixture per minute for a period of time sufficient to permit the absorption and reaction of about 0.03 mol of ozone per mol of 1,5,9-cyclododecatriene. This required about 1 hour and represented a conversion of about 1/24 of the olefinic bonds in the 1,5,9-cyclododecatriene to peroxide addition products of ozone and the 1,5,9-cyclododecatriene.

At the end of this time, the reaction mixture was warmed to room temperature and the solvent mixture was evaporated under a reduced pressure to provide two liquid phases. About 100 ml. of petroleum ether were added to the two-phase mixture and the peroxidic monoozonolysis product was extracted from the resultant mixture by extraction with three 30 ml. portions of 90 percent aqueous methanol. The methanol was evaporated under a reduced pressure to provide about 50 ml. of the doubly unsaturated non-conjugated monoozonolysis product.

Example II 5 grams of 1,5,9-cyclododecatriene was dissolved in a solvent mixture consisting of 50 ml. of methanol and 50 ml. of pentane. The resultant solution was chilled to about −78° C. and a gaseous mixture of oxygen and ozone containing about 2 mol percent of ozone was passed through the solution for a period of time sufficient to permit the absorption of about 1 mol of zone per mol of 1,5,9-cyclododecatriene. In this case, the ozonolysis reaction is non-selective whereby the reaction mixture contains mono- and poly-ozonolysis products which are not readily separable from each other.

Example III

Example I is repeated with one exception, about 0.6 mol of ozone is reacted per mol of cyclododecatriene. Again, the ozonolysis reaction is not selective to the monoozonolysis product.

OXIDATION OF OXONOLYSIS PRODUCTS

Example IV

The monoozonolysis product of Example I was added to an aqueous solute solution of methanol. This solution was rapidly added dropwise to a stirred suspension of 16 grams of silver oxide in 100 ml. of water at room temperature (25° C.). As a consequence, an oxidation reaction was initiated, as evidenced by a spontaneous temperature rise to about 30° C. When no further rise in temperature was detectable, about 50 ml. of a 10 percent solution of sodium hydroxide was added dropwise over the course of about 1 hour. An exothermic reaction was initiated which resulted in a temperature rise to about 55° C. At the end of the sodium hydroxide addition, heating was continued for about 2 hours at a temperature within the range of about 40° to about 75° C.

The product from the oxidation reaction was filtered to remove free silver, the filtrate was evaporated to one-half volume, cooled to ice water temperature, and acidified to a pH of 2 with 10 percent nitric acid. On standing at about 0° C., about 7 grams of light yellow crystals melting at 61–64° C. separated. On recrystallization from aqueous acetic acid solution, white salt-like crystals were obtained melting at 65.0–66.2° C. This consititutes about a 90 percent recovery, based upon the 1,5,9-cyclododecatriene starting material.

The analysis for this product is as follows:

Analysis.—Calculated for $C_{12}H_{22}O_4$: C, 63.70; H, 8.02; M.W., 226.26; N.E., 112. Found, C, 63.93; H, 8.33; M.W. 223; N.E., 114 (phenolph.).

The product was slightly soluble in water and completely soluble in carbon tetrachloride and carbon disulfide. It absorbed bromine rapidly and exhibited a strong trans-olefin infrared absorption band in the region of about 965 $cm.^{-1}$. Further ozonolysis of a portion of the product in methanol solution at −78° C. resulted in the absorption of 2 mols of ozone per mol of starting material and the resultant ozonolysis product when oxidized with performic acid provided pure succinic acid.

The foregoing establishes the structure of the product as substantially pure 4,8-dodecadien-1,12-dioic acid.

Example V

When the ozonolysis product of Example II is used as a starting material and Example IV is otherwise repeated, the product of the oxidation reaction is a mixture of acids. This is likewise the case when the ozonolysis product of Example III is utilized as a starting material and Example IV is otherwise repeated.

*Example VI*

Example IV was repeated with one exception. There was no addition of an aqueous solution of sodium hydroxide during the oxidation reaction. The product was an intractible mixture which could not be resolved.

*Example VII*

Example IV was repeated with one exception. The aqueous solution of sodium hydroxide was added prior to the addition of the silver oxide. Again, the product was an intractable mixture which could not be resolved.

What is claimed is:

1. A process for converting an olefinic ozonolysis product of a monocyclic nonconjugated polyolefin to the corresponding α,ω-olefinic acid which comprises adding a heavy metal oxide to said ozonolysis product to initiate an oxidation reaction, and after initiation of said oxidation reaction adding the hydroxide of a metal chosen from the group consisting of alkali metals and alkaline earth metals to establish basic oxidation conditions whereby said olefinic monoozonolysis product is oxidized to a salt of the corresponding olefinic acid and said hydroxide and thereafter acidifying said salt to the corresponding acid.

2. A process for converting a monoozonolysis product of 1,5,9-cyclododecatriene to 4,8-dodecadien-1,12-dioic acid which comprises adding a heavy metal oxide to said monoozonolysis product to initiate an oxidation reaction, adding the hydroxide of a metal chosen from the group consisting of alkali metals and alkaline earth metals to said reaction mixture after initiation of said oxidation reaction to thereby convert said ozonolysis product to a salt of 4,8-dodecadien-1,12-dioic acid, and said hydroxide, and acidifying said salt to 4,8-dodecadien-1,12-dioic acid.

3. A process for converting a monoozonolysis product of 1,5,9-cyclododecatriene to 4,8-dodecadien-1,12-dioic acid which comprises adding an aqueous suspension of a heavy metal oxide to said monoozonolysis product to initiate an oxidation reaction, adding a molar excess of an aqueous solution of sodium hydroxide to the reaction mixture after initiation of said oxidation reaction to thereby convert said monoozonolysis product to the sodium salt of 4,8-dodecadien-1,12-dioic acid, and acidifying the resultant reaction mixture after the completion of the oxidation reaction to convert the said sodium salt to 4,8-dodecadien-1,12-dioic acid.

4. A process which comprises contacting a monocyclic nonconjugated polyolefin with an ozone-containing gas until about 0.1 to about 0.3 mol of ozone per mol of polyolefin has been reacted to thereby selectively convert said polyolefin to an olefinic monoozonolysis product, adding an oxide of a heavy metal to said ozonolysis product to initiate an oxidation reaction, after initiation of said oxidation reaction adding the hydroxide of a metal chosen from the group consisting of alkali metals and alkaline earth metals to establish basic oxidation conditions whereby said olefinic monoozonolysis product is oxidized to a salt of the corresponding olefinic acid and said hydroxide and thereafter acidifying said salt to the corresponding acid.

5. A process for preparing 4,8-dodecadien-1,12-dioic acid which comprises contacting 1,5,9-cyclododecatriene with an ozone-containing gas until from about 0.1 to about 0.3 mol of ozone per mol of 1,5,9-cyclododecatriene has been reacted to provide a monoozonolysis product of 1,5,9-cyclododecatriene, adding an oxide of a heavy metal to said monoozonolysis product to initiate an oxidation reaction, adding the hydroxide of a metal chosen from the group consisting of alkali metals and alkaline earth metals to said reaction mixture after initiation of said oxidation reaction to thereby convert said ozonolysis product to a salt of 4,8-dodecadien-1,12-dioic acid and said hydroxide, and acidifying said salt to 4,8-dodecadien-1,12-dioic acid.

6. A process for preparing 4,8-dodecadien-1,12-dioic acid which comprises dissolving 1,5,9-cyclododecatriene in a mixture of dichloromethane and ethanol, contacting said solution with ozone at a temperature within the range of about −80° to about +25° C. with a mixture of oxygen and ozone containing from about 2 to 6 mol percent of ozone for a period of time sufficient to permit the absorption of from about 0.1 to about 0.3 mol of ozone per mol of 1,5,9-cyclododecatriene whereby said 1,5,9-cyclododecatriene is converted to the monoozonolysis product thereof, adding to said monoozonolysis product an aqueous suspension of silver oxide at a temperature within the range of about 0° to about 50° C. to initiate an oxidation reaction, adding about 0.05 to about 1.5 mol equivalents of sodium hydroxide per mol of monoozonolysis product as an aqueous solution after initiation of said oxidation reaction to thereby convert said monoozonolysis product to the sodium salt of 4,8-dodecadien-1,12-dioic acid, and acidifying the reaction mixture at the end of said oxidation reaction to form 4,8-dodecadien-1,12-dioic acid.

7. A process for converting an olefinic ozonolysis product of a monocyclic nonconjugated polyolefin to the corresponding α,ω-olefinic acid which comprises adding silver oxide to said ozonolysis product to initiate an oxidation reaction, after initiation of said oxidation reaction, adding the hydroxide of a metal chosen from the group consisting of alkali metals and alkaline earth metals to establish basic oxidation conditions whereby said olefinic monoozonolysis product is oxidized to a salt of the corresponding olefinic acid and said hydroxide, and acidifying said salt to the corresponding acid.

8. A process for converting a monoozonolysis product of 1,5,9-cyclododecatriene to 4,8-dodecadien-1,12-dioic acid which comprises adding silver oxide to said monoozonolysis product to initiate an oxidation reaction, adding the hydroxide of a metal chosen from the group consisting of alkali metals and alkaline earth metals to said reaction mixture after initiation of said oxidation reaction to thereby convert said ozonolysis product to a salt of 4,8-dodecadien-1,12-dioic acid and said hydroxide, and acidifying said salt to 4,8-dodecadien-1,12-dioic acid.

9. A process for converting a monoozonolysis product of 1,5,9-cyclododecatriene to 4,8-dodecadien-1,12-dioic acid which comprises adding an aqueous suspension of silver oxide to said monoozonolysis product to initiate an oxidation reaction, adding a molar excess of an aqueous solution of sodium hydroxide to the reaction mixture after initiation of said oxidation reaction to thereby convert said monoozonolysis product to the sodium salt of 4,8-dodecadien-1,12-dioic acid, and acidifying the resultant reaction mixture after the completion of the oxidation reaction to convert the said sodium salt to 4,8-dodecadien-1,12-dioic acid.

10. A process which comprises contacting a monocyclic nonconjugated polyolefin with an ozone-containing gas until about 0.1 to about 0.3 mol of ozone per mol of polyolefin has been reacted to thereby selectively convert said polyolefin to an olefinic monoozonolysis product, adding silver oxide to said ozonolysis product to initiate an oxidation reaction, adding the hydroxide of a metal chosen from the group consisting of alkali metals and alkaline earth metals to establish basic oxidation conditions whereby said olefinic monoozonolysis product is oxidized to a salt of the corresponding olefinic acid and said hydroxide, and thereafter acidifying said salt to the corresponding acid.

11. A process for preparing 4,8-dodecadien-1,12-dioic acid which comprises contacting 1,5,9-cyclododecatriene with an ozone-containing gas until from about 0.1 to about 0.3 mol of ozone per mol of 1,5,9-cyclododecatriene has been reacted to provide a monoozonolysis product of the 1,5,9-cyclododecatriene, adding silver oxide to said monoozonolysis product to initiate an oxidation reaction, adding the hydroxide of a metal chosen from the group consisting of alkali metals and alkaline earth metals to said reaction mixture after initiation of said oxidation reaction to thereby convert said ozonolysis product to a salt of 4,8-dodecadien-1,12-dioic acid and said hydroxide, and acidifying said salt to 4,8-dodecadien-1,12-dioic acid.

References Cited in the file of this patent

UNITED STATES PATENTS

| | | |
|---|---|---|
| 2,680,713 | Lindsey et al. | June 8, 1954 |
| 2,848,490 | Niebling et al. | Aug. 19, 1958 |

OTHER REFERENCES

Bailey: "Chem. Reviews," vol. 58, No. V (1958), pp. 925–1010.